United States Patent
Glassenberg et al.

(10) Patent No.: US 9,056,247 B2
(45) Date of Patent: Jun. 16, 2015

(54) SYSTEM AND METHOD FOR EFFICIENT CHARACTER ANIMATION

(75) Inventors: Sam Glassenberg, New York, NY (US); Nicholas M Covington, Playa Del Rey, CA (US); Yaron Leifenberg, Tel Aviv (IL); Alon Cohen, Tel Aviv (IL)

(73) Assignee: FUNTACTIX, New York, NY (US)

( * ) Notice: Subject to any disclaimer, the term of this patent is extended or adjusted under 35 U.S.C. 154(b) by 533 days.

(21) Appl. No.: 13/407,937

(22) Filed: Feb. 29, 2012

(65) Prior Publication Data

US 2013/0225293 A1 Aug. 29, 2013

(51) Int. Cl.
*A63F 13/40* (2014.01)
*G06T 13/40* (2011.01)

(52) U.S. Cl.
CPC .......... *A63F 13/10* (2013.01); *A63F 2300/6607* (2013.01); *A63F 2300/6615* (2013.01); *G06T 13/40* (2013.01)

(58) Field of Classification Search
CPC .......... G06T 17/20; G06T 19/00; G06T 13/40; G06T 2215/00; G06T 13/80; G06T 2213/04; G06T 2213/08; G06T 13/20
See application file for complete search history.

(56) References Cited

U.S. PATENT DOCUMENTS

| 7,573,477 | B2 | 8/2009 | Ng-Thow-Hing | |
|---|---|---|---|---|
| 2010/0156935 | A1* | 6/2010 | Lim et al. | 345/647 |
| 2011/0069065 | A1* | 3/2011 | Hiwada et al. | 345/420 |

OTHER PUBLICATIONS

Kavan et al. "Polypostors: 2D Polygonal Impostors for 3d Crowds," ACM, Feb. 15-17, 2008.*
Bryan Dudash, "Skinned Instancing," NVIDIA, Feb. 2007.*
Ashraf et al., "Hardware Accelerated Skin Deformation for Animated Crowds," School of Computing, National University of Singapore, Springer-Verlag, 2007.*
Ingu et al., "A Multi-resolution Technique for Real-time Animation of Large Crowds", Springer-Valeg, 2006.*

* cited by examiner

*Primary Examiner* — Kee M Tung
*Assistant Examiner* — Nicholas R Wilson
(74) *Attorney, Agent, or Firm* — Graeser Associates International Inc; Dvorah Graeser

(57) ABSTRACT

A system and method for producing realistic computer character based animation, for example for computer games, by decomposing each character into a plurality of elements, preparing low resolution approximations of at least some elements for constructing a three dimensional approximation of the character and then applying and transforming one or more sprites to the approximations of the elements.

17 Claims, 15 Drawing Sheets

SYSTEM AND METHOD FOR EFFICIENT CHARACTER ANIMATION

FIELD OF THE INVENTION

The present invention is related to efficient animation, and in particular, to efficient animation which is based upon sprite sheets.

BACKGROUND OF THE INVENTION

Computer animation has many applications, particularly for content and games accessed through the Internet. Computer gaming benefits from the increased realism of computer animation; however, even though available bandwidth for the average user is increasing, such animation places a heavy burden on most users' Internet connections and processors. Such animation is particularly problematic with regard to anthropomorphic characters, which require dynamic, realistic movements. Furthermore, there is frequently a desire for dynamic customization, such as for interactive animation, including computer games for example. Certain types of character animation also feature motion capture animation, in which the physical movements are captured and then used as the basis for rendering, which is again a highly computationally intensive process.

Computer animation is further challenged by the relatively low computational power of widely available rendering engines. For example, many websites rely on such rendering engines as Flash, which have very limited three dimensional rendering capabilities. Mobile devices are also highly limited. Therefore, various solutions have been proposed to render high fidelity characters on devices and/or software interfaces/engines with limited three dimensional rendering capability.

One current solution involves the use of sprite sheets, which are typically prerendered characters which can be used for more efficiently rendering the characters while also using lower computer bandwidth for transmitting the information needed to display the animation on a user's computer. However, even sprite sheets can place a huge burden on overall bandwidth requirements for download. Therefore, current animation solutions involving sprite sheets often sacrifice realism, the ability to customize characters, smooth movements and the like to avoid this burden.

Alternative solutions involve three dimensional animation approximations or "hacks", severely reducing visual appeal and realism of the resultant animation. Odd artifacts also appear with such "hacks", further reducing the quality of the animated characters. One example of such a "hack" is rendering three dimensional geometry at extremely low polygon counts or density, which significantly reduces the visual fidelity of the resultant character.

These problems are exacerbated by the recent desirability of viewing animation and playing games on mobile telephones and other mobile devices, which have even greater bandwidth and performance limitations.

Thus, currently available animation solutions must either sacrifice quality, visual appeal and realism of the resultant animated characters, or alternatively consume excessive amounts of bandwidth.

SUMMARY OF THE INVENTION

There is a need for, and it would be useful to have, a system and method for providing computer animation, for example for games, that is capable of being executed on a large range of platforms and devices, including those platforms and devices with limited three dimensional rendering capacity.

There is also a need for, and it would be useful to have, a system and method for providing computer animation that does not place a heavy burden on users' Internet connections and processors, while maintaining a high level of realism.

The present invention, in at least some embodiments, overcome these drawbacks of the background art by providing a system and method for producing realistic character based computer animation, for example for computer games, by decomposing each character into a plurality of elements, preparing low resolution approximations of at least some elements for constructing a three dimensional approximation of the character and then applying and transforming one or more sprites to the approximations of the elements. This process takes advantage of the many useful properties of sprites and sprite sheets, yet is much more efficient and consumes much less bandwidth than conventional methods using sprite sheets.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a mobile telephone, a cellular telephone, a smart phone, a portable communication device, a PDA (personal data assistant), a netbook and a thin client. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the descrip- In the drawings.

DETAILED DESCRIPTION OF THE INVENTION

The present invention, in at least some embodiments, provides a system and method for producing realistic computer animation, for example for computer games, by decomposing each character into a plurality of elements, preparing low resolution approximations of at least some elements for constructing a three dimensional approximation of the character and then applying and transforming one or more sprites to the approximations of the elements.

Figure 1:
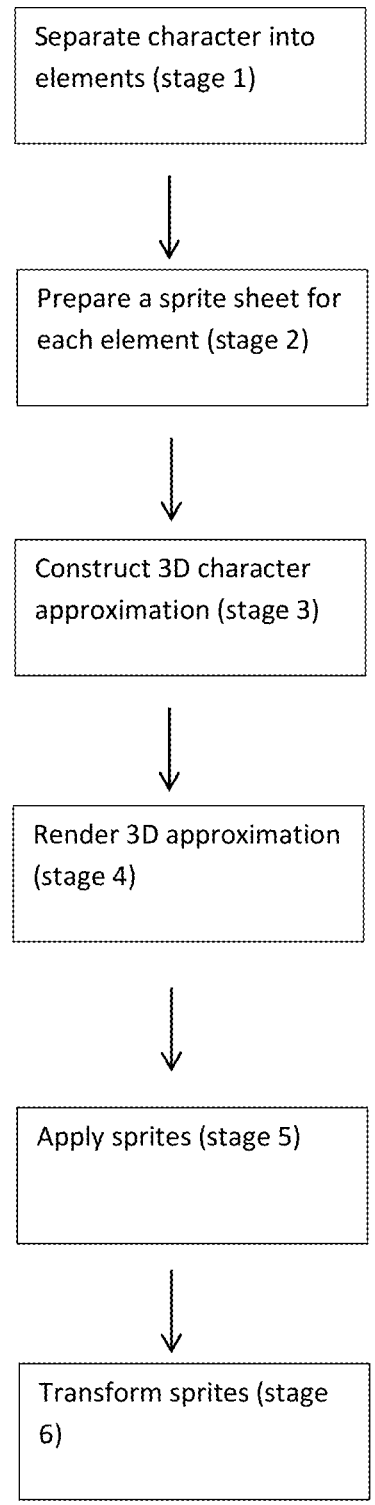
FIG. 1 shows an exemplary, illustrative method according to at least some embodiments of the present invention for preparing animated characters as a plurality of elements.

Turning now to the drawings, FIG. 1 shows an exemplary, illustrative method according to at least some embodiments of the present invention for preparing animated characters as a plurality of elements. As shown, in stage 101, a character is separated into a plurality of elements, including a torso and at least one limb. By "torso" it is meant a central element of a character, to which one or more limbs are attached. A "limb" may also optionally include a head or tail, in addition to or in place of one or more arms or legs. An "arm" is a limb that features a hand, while a "leg" is a limb that features a foot. If the character is anthropomorphic, then it may be assumed to feature a torso, a head, two arms and two legs, but of course the present invention is not limited to this implementation. Nonetheless, for the sake of clarity, the below discussion relates to such an implementation.

As a non-limiting example of a non-anthropomorphic character, an automobile could also optionally be animated according to the below model. For example, optionally wheels could be animated as rigid objects (for example corresponding to the below description of animating hands), the car body or center piece could bend and twist (corresponding to the torso in the below description), and so forth. Such bending or twisting could optionally be due to anthropomorphization of the character or due to damage caused to the car, for example.

In stage 102, a sprite sheet is prepared for each element. If the limbs feature some type of chirality (for example, left and right legs or arms), then optionally a separate sprite sheet is prepared for each such limb, so that for example separate sprite sheets may optionally be prepared for right and left arms. Alternatively, for such "paired" elements as paired limbs, sprite sheets may optionally be shared. As described in greater detail below, a sprite sheet according to at least some embodiments of the present invention preferably comprises a render of high resolution three dimensional geometry and texture. Also as described in greater detail below, for some elements such as hands that are completely or generally rigid, optionally the sprite determines the element, as opposed to determining the element with a skeleton over which the sprite is overlaid.

The sprite sheets are optionally and preferably fully prepared before the character is animated (or at least before the animation is displayed). More preferably (and typically), the sprite sheets are prepared offline; they are then optionally downloaded as a partial or complete set for each character, most preferably at least before the animation is displayed. Optionally only those sprites from the sprite sheet which are required for immediate animation are downloaded. For example, if one or more sprites are not required until a computer game has been played for some time, then that one or more sprites do not need to be downloaded initially. Preferably, the sprites are stored in a hierarchical data structure according to the likelihood of being required at any particular time.

In stage 103, low resolution approximations of at least some elements are constructed for constructing a three dimensional approximation of the character. Non-limiting examples of elements for which such three dimensional approximations are constructed include a torso and a limb. If the character features a plurality of different types of limbs, each type of limb preferably has its own corresponding three dimensional approximation. Construction of such three dimensional approximations is also optionally and preferably (and typically) performed offline, and as for the sprite sheets, is optionally and preferably fully prepared before the character is animated (or at least before the animation is displayed).

Optionally and preferably, rigid elements (like the head, hair, hands, hat, etc.) are not warped in any way. The correct sprite, based on the camera's direction and the object's angle, is preferably selected and drawn, more preferably as a single sprite and most preferably without warping or the use of polygons, as described in greater detail below.

According to at least some embodiments of the present invention, stages 101-103 are optionally and preferably performed at least before the animation is displayed, and are optionally performed offline such that the results may be downloaded, again at least before the animation is displayed but more preferably before the process of rendering the animation starts. The subsequent stages below relate to the process of animation.

In stage 104, the three dimensional approximation of at least a portion of the character is rendered in a first pose or position, as an initial stage in animation. Preferably those elements which have separate three dimensional approximations are rendered separately. Optionally, rigid objects such as a head have no three dimensional approximation, while radially symmetric objects such as arms and legs optionally are not rendered with regard to a first pose or position. Such objects or elements are therefore preferably not rendered in stage 104. Instead, such elements are preferably processed as described in stage 105.

With regard to elements that require such an approximation, such as the torso for example, such rendering preferably includes determining the angles of a plurality of polygons that approximate the three dimensional structure, as described in greater detail below. Without wishing to be limited by a single advantage or a closed list of advantages, such rendering is particularly advantageous for character elements that twist significantly.

In stage 105, the sprites are applied to the three dimensional approximation of the character. The sprites may optionally be selected in this stage or alternatively may be reused from a previous rendering of the character, as described in greater detail below.

In stage 106, one or more sprites are optionally transformed after application. Such a transformation may optionally be performed according to the three dimensional approximations(s) rendered in stage 104 for the torso. For elements such as one or more limbs, preferably a different process is used to transform the sprites as described in greater detail below. For elements such as the head, which are relatively rigid, yet a different process may optionally be used, which involves applying the sprite directly, optionally without transformation, such that this stage is optionally not performed. The resultant character may then optionally be displayed.

Stages 104-106 are preferably repeated as the character is animated, each time that a pose is changed. However, as described in greater detail below, optionally one or more sprites may be reused, such that stage 104 does not necessarily require selection of one or more new sprites.

Figure 2A:
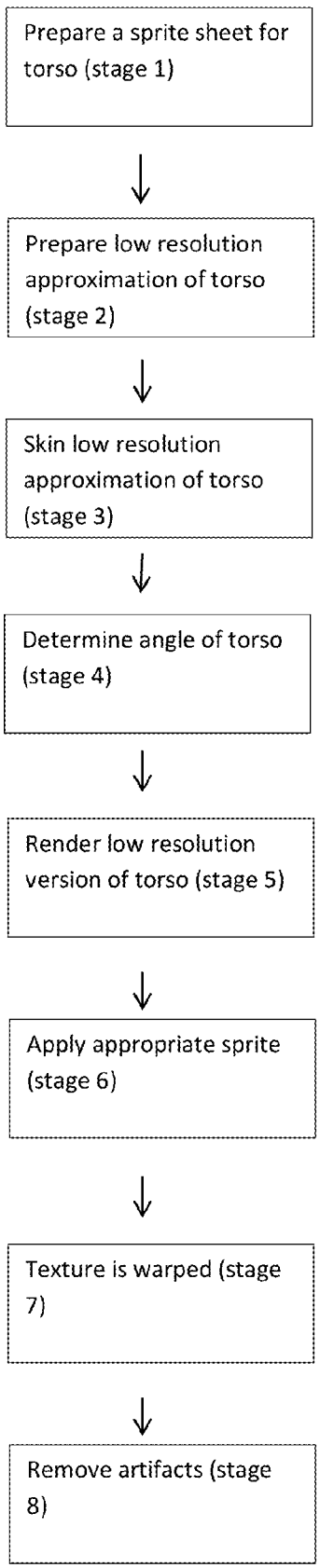
FIG. 2A shows an exemplary, illustrative method according to at least some embodiments of the present invention for rendering a torso element of a character.
Figure 2B:
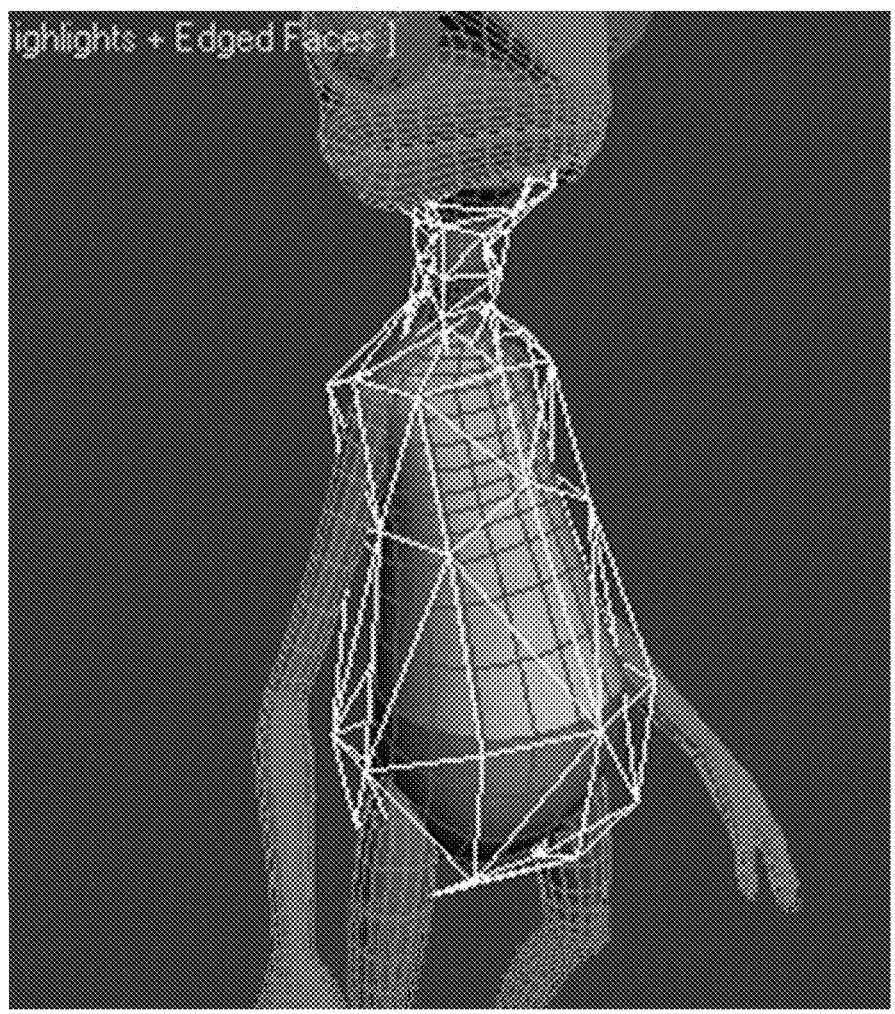
FIG. 2B shows the three dimensional approximation of an exemplary, non-limiting torso element superimposed on an exemplary, non-limiting character, for the purpose of illustration only and without any intention of being limiting.
Figure 2C:
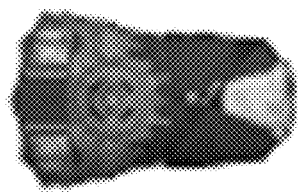
FIG. 2C shows a non-limiting example of a torso sprite and FIG. 2D shows a non-limiting example of the corresponding torso sprite sheet.
Figure 2D:
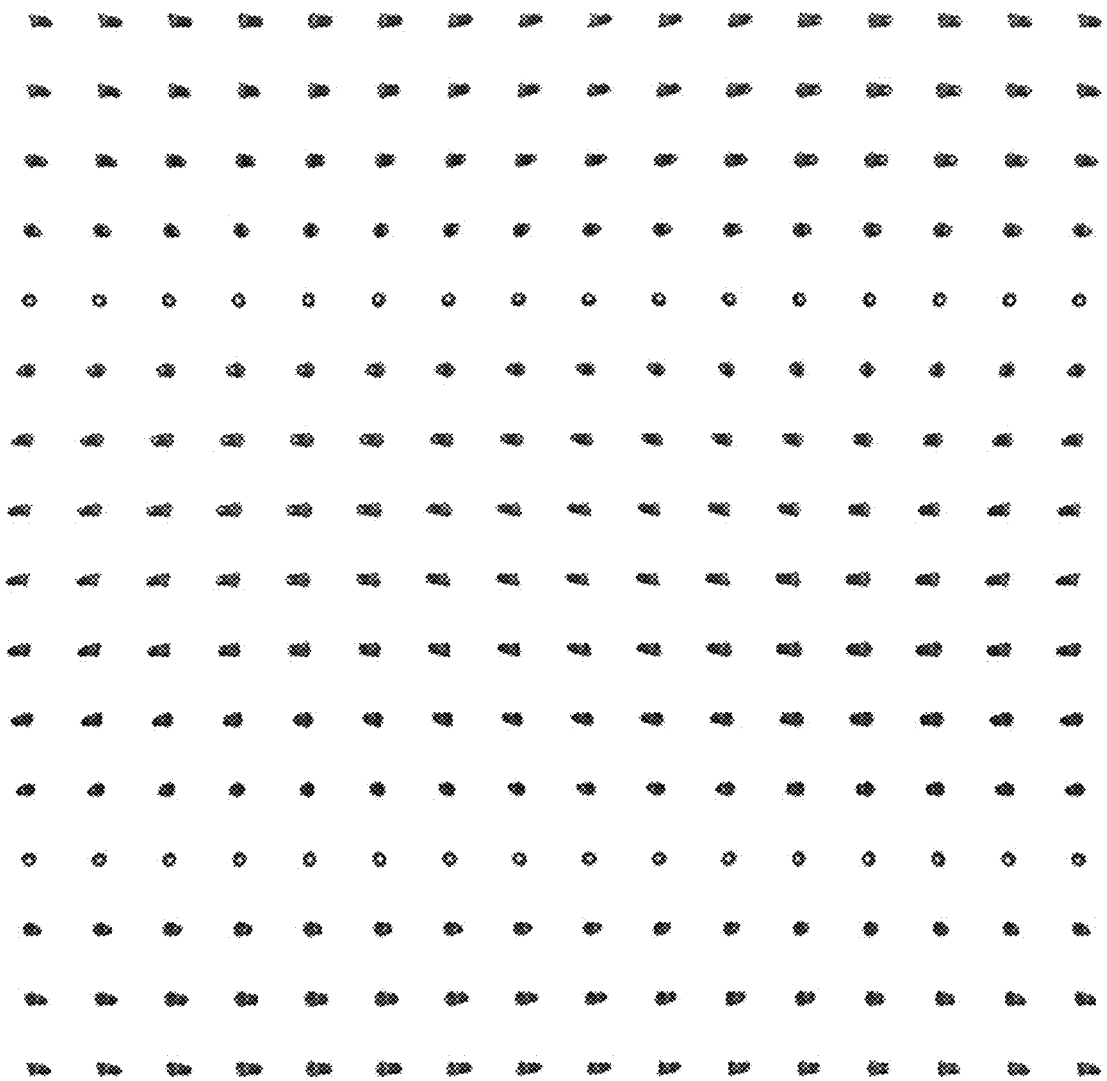

FIG. 2A shows an exemplary, illustrative method according to at least some embodiments of the present invention for rendering a torso element of a character; FIG. 2B shows the three dimensional approximation of an exemplary, non-limiting torso element superimposed on an exemplary, non-limiting character, for the purpose of illustration only and without any intention of being limiting; FIG. 2C shows a non-limiting example of a torso sprite and FIG. 2D shows a non-limiting example of the corresponding torso sprite sheet.

As shown in FIG. 2A, in stage 201, a sprite sheet is prepared for the torso, comprising a plurality of torso sprites. Optionally and preferably, all torso sprites are prepared in advance as previously described. The sprites feature high resolution geometry and texture of the torso, also as previously described. FIG. 2C shows a non-limiting example of a torso sprite, while FIG. 2D shows a non-limiting example of a sprite sheet which also includes the torso sprite of FIG. 2C.

In stage 202, a low resolution three dimensional approximation of the torso is prepared; a non-limiting example is shown with regard to FIG. 2B. As shown, the character's high resolution torso (in blue) is surrounded by its low-resolution three dimensional torso approximation (white wireframe). The high resolution version of the torso is not required for animation, but may optionally be prepared as an intermediate step toward preparation of the low resolution version of the torso. Also, additionally or alternatively, the high resolution torso shown is actually a high resolution mesh that may optionally be used to prepare the sprite sheet.

In stage 203, the low resolution three dimensional approximation of the torso is optionally skinned. Optionally and preferably such skinning includes but is not limited to standard weighted character skinning, cloth simulation or soft-body dynamics simulation, or a combination thereof. The skinning preferably supports the underlying geometry of the torso but is not a rigid overlay; instead, skinning is preferably performed so as to allow modeling of both static and dynamic deformations (with the latter being caused by movement of the character). For example, cloth simulation typically is supported by a mesh of polygons, which allows for collisions to be modeled, for example between the body of the character wearing the cloth and the cloth itself. The behavior of such polygons in the case of collision (for example, deformation, "bounce" and so forth) is typically determined by a combination of the characteristics of the cloth itself (light, heavy, stiff, flexible and so forth) and the movement of the character. One well known technique for handling such collisions relates to bounding boxes. However, cloth simulation may optionally be performed at low resolution, followed by sprite-based warping.

Soft body dynamics are also typically performed with a plurality of polygons, which are then deformed in response to movement of the character, collisions and so forth.

Stages 201 and 202 are preferably performed off-line, in advance of animating the character as previously described. Stage 203 may optionally be performed off-line as well or alternatively may be performed as animation starts. Stage 203 may also optionally be performed at runtime, if dynamic animation blending, clothing simulation, or camera movement are desired. If computed off-line, the low resolution geometry may optionally be stored as a set of 2D coordinates.

Next, as the character is rendered for animation, the following stages are preferably performed. In stage 204, the angle of the torso is determined, so that the "pose" of the torso may be accurately rendered.

In stage 205, the low resolution three dimensional approximation of the torso is rendered, preferably as a plurality of polygons (for example, optionally as a plurality of triangles).

In stage 206, the appropriate sprite is selected according to the angle of the torso (as previously determined in stage 204) and is applied as texture. Optionally, as previously described, the sprite may have already been selected from a previous rendering of the character (for example for ongoing animation) in a previous pose, in which case the already selected sprite is optionally adjusted according to the new angle of the torso as previously described.

In stage 207, the texture is warped, preferably by two dimensional (2D) warping that simulates 3D warping. Such warping involves drawing 2D polygons (preferably triangles), preferably in such a manner that they are compatible with readily available drawing engines such as Flash and OpenGL, for example.

Stages 204-207 are then preferably repeated as the character adopts different poses, such that the angle of the torso changes. Again, as previously noted, optionally a previously selected sprite is adapted, rather than selecting a new sprite, in stage 206.

In stage 208, as stages 204-207 are repeated, optionally any non-relevant polygons from the low resolution three dimensional approximation of the torso are removed, to prevent artifacts.

Figure 3:
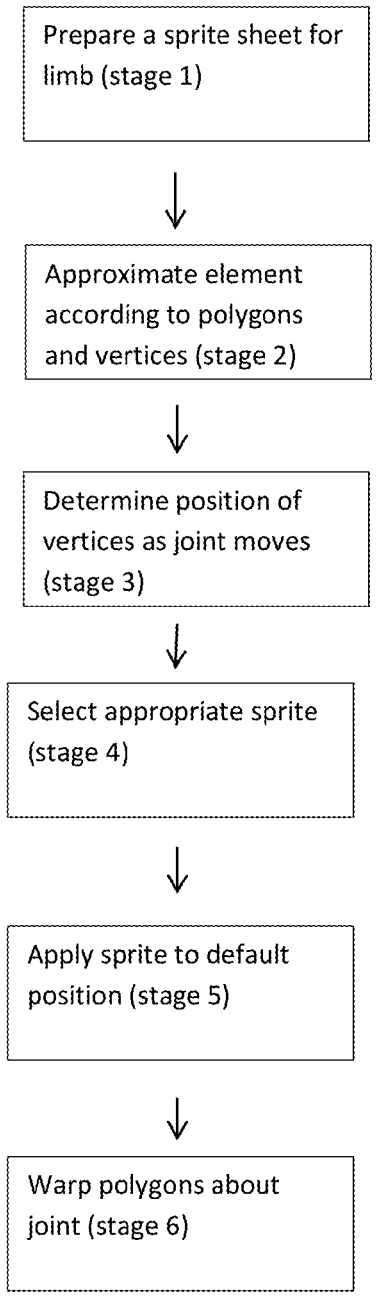
FIG. 3 shows a process for transforming sprites for elements such as limbs according to at least some non-limiting embodiments of the present invention.

As described with regard to stages 105 and 106 of FIG. 1, sprites are optionally transformed according to a different process for elements such as limbs than for elements such as the torso, as shown in FIG. 3. The process described in FIG. 3 generates low-resolution 2D geometry that is used to warp 2D rendered images of high-resolution 3D geometry in order to create the illusion of high-resolution realtime 3D rendering, but without the high computational overhead or performance problems.

The below described method enables the approximation of smooth, dynamic 3D rendering of high-resolution character elements that are not rigid yet which are rotationally symmetric about their long axis or almost rotationally symmetric. Non-limiting examples of such elements include arms, legs, and tails, or indeed any "limb-like" appendage. Each of these elements is assumed to have at least one joint.

In stage 301, the 3D geometry of the element is rendered offline into a sprite sheet, comprising a plurality of sprites featuring the element in a variety of positions, angles and so forth, as previously described. The sprites optionally show the element in a variety of "bent" positions as well, bent along the various joints (or only a single joint, if applicable) that the element includes. Alternatively and preferably, the sprites show the element in the "rest pose" only. Optionally and preferably, the sprites are subdivided such that sprites for limbs having a plurality of joints are constructed such that only one joint is included per sprite.

In stage 302, the element is approximated by a plurality of polygons (in this non-limiting example, triangles) and a plurality of vertices for each joint, which determine the potential position and degrees of freedom of movement of the joint.

In stage 303, the position of the vertices is determined as the joint moves.

In stage 304, the appropriate sprite is selected according to the rotation of the element.

In stage 305, the sprite is applied to the polygons in a default position, such as an "at rest" pose, although optionally any pose may be selected.

In stage 306, the polygons are warped appropriately about the joint so that the movement of the joint results in a realistic appearance of the element. The applied sprite is warped due to the deformation of the polygons.

Figure 4A:
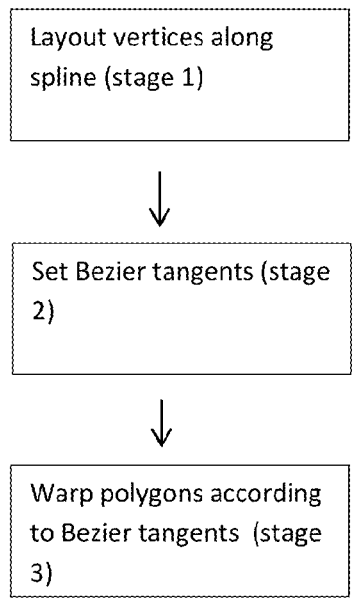
FIGS. 4A and 4B below represent two non-limiting, illustrative, exemplary embodiments of methods for performing the method of FIG. 3 in more detail.
Figure 4B:
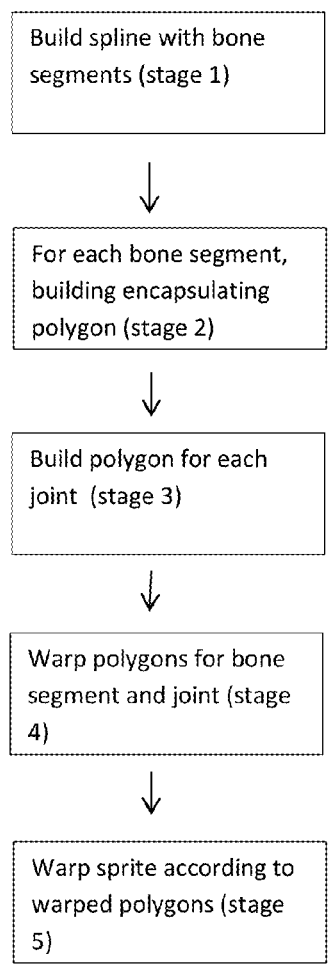

FIGS. 4A and 4B below represent two non-limiting, illustrative, exemplary embodiments of methods for performing the method of FIG. 3 in more detail.

Turning now to FIG. 4A, in stage 401, the vertices are laid out along a spline. The spline has 'n' primary control points, where 'n' is the number of joints on the limb. The control points of each spline correspond to the joint positions—they are placed a configurable distance from the joint, in a direction normal to the joint. The spline may optionally comprise a Bezier spline (catmull-rom, or any other spline).

In stage 402, the Bezier tangents are set to the direction of the joint within the limb, which can be calculated based on relative joint angles.

In stage 403, the triangles are warped according to the Bezier tangents.

Limbs are difficult to render correctly without artifacts, as they feature joints connected by (at least relatively) rigid sections, which approximate the "bone" of the limb. Various artifacts may arise of from the combination of twisting and rotating structures with relatively rigid portions. According to at least some embodiments of the present invention, a method is provided which overcomes these problems by rendering the rigid portions of the limb separately from the joints. Limb joints are preferably rendered separately, rather than defining a single limb with one or more control points, in which each control point correspond to a joint, as opposed to the method described with regard to FIG. 4A above.

The method described in FIG. 4B determines the best warping for the triangles by building both a polygonal object that encapsulates the length and user-defined width of each bone, and a separate, unique polygonal object built around each joint that deforms via bone rotation in an ideal way. The combination of the rigid element and of the deformable joint (optionally with a plurality of each such element) collectively forms a bone chain. A spline shape, with a point/knot at each bone position, is generated on top of the bone chain. Each bone length (that is, each rigid section of the limb) is represented by a single segment of the spline shape, and the data for all polygonal objects are derived from each aforementioned segment.

Figure 4C:
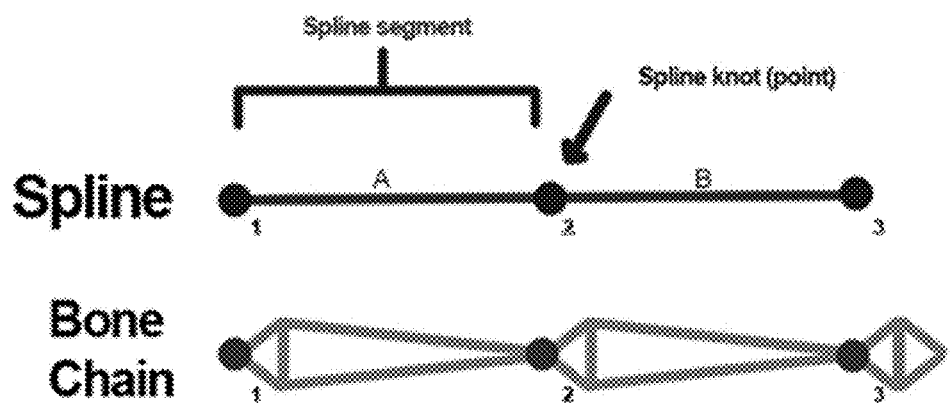
FIG. 4C shows an exemplary, illustrative bone chain and corresponding spline.

Turning now to FIG. 4B, in stage 4-1, a spline is built using bone locations in world-space. This spline shares each point with each bone segment, and a final point at the end of the length of the last bone. Each bone within the bone chain/limb is represented by a segment of the overlying spline. Each spline segment can be represented by an interpolating value of 0% to 100%; 0% being the start of a spline segment and 100% being the end. From each spline, it is possible to use this interpolation percentage to calculate a position and tangent (direction) at any given point along a segment or spline length. An exemplary, illustrative bone chain and corresponding spline are shown in FIG. 4C, at the bottom and top, respectively. Each point is labeled with a number ("1", "2" etc) and each segment is labeled with a letter ("A", "B" etc).

Figure 4D:
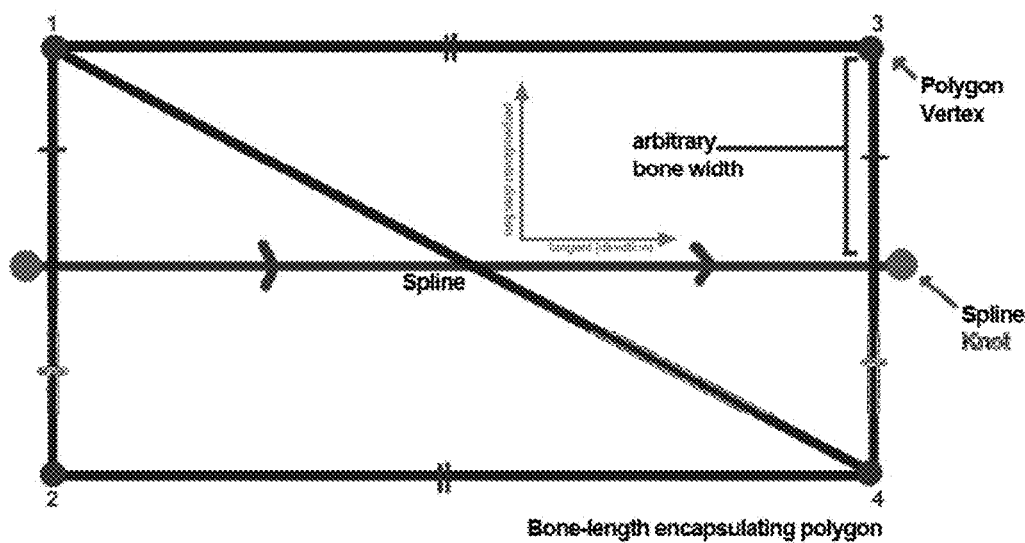
FIG. 4D shows a non-limiting example of an encapsulating polygon.

Next in stage 4-2, for each bone segment of the bone chain, an encapsulating polygon is built along the length and user-defined width of the bone segment. This polygon consists of four points, or vertexes, each of which is derived in a similar way with modified parameters. A non-limiting example of such a polygon is shown in FIG. 4D. Vertex 1 is located at the start of a bone segment, and is built by querying the tangent and position of the representative spline segment at 1% interpolation. A vector perpendicular to the bone segment direction in camera space is calculated by taking the cross product of the spline tangent at 1% interpolation and the view vector, [0,0,−1], and then multiplying this result by the arbitrary bone length. The perpendicular vector is then added to the initial spline position at 0% interpolation.

Vertex 2 features the same calculation, but uses the inverse of the arbitrary bone segment width. Vertex 3 features the same calculation, but uses a spline interpolation of 99%. Vertex 4 features the same calculation, but uses a spline interpolation of 99%, and the inverse of the arbitrary bone segment width.

Figure 4E:
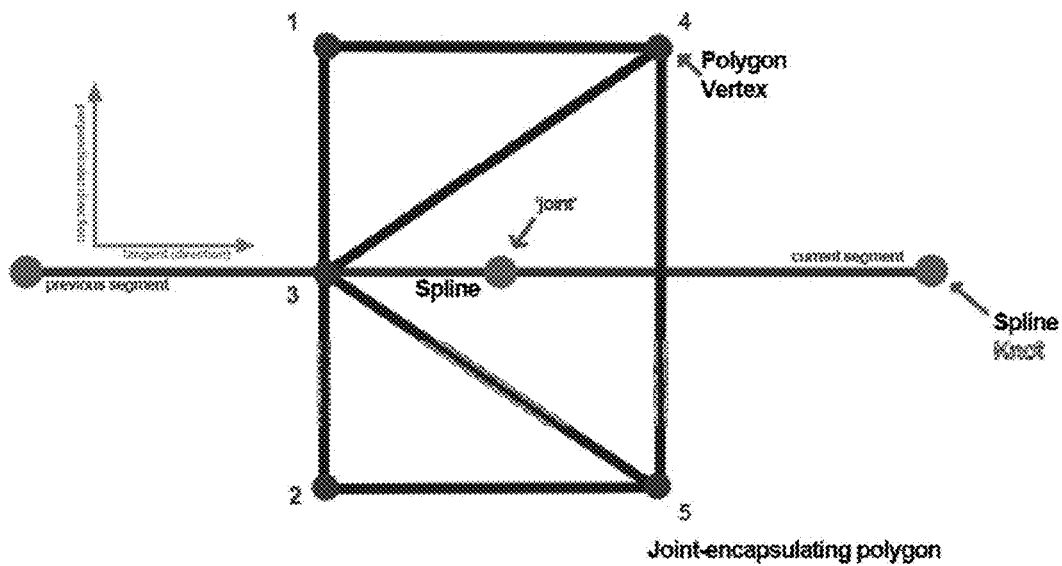
FIG. 4E shows an example of a special polygonal object for each joint.

In stage 4-3, a special polygonal object for each joint is built to overlap each joint of the bone chain, an example of which is shown in FIG. 4E. This polygonal object uses the same method of computation as the bone-length polygon described previously, but with modified parameters. Vertex 1 is built using 99% interpolation of the previous spline segment. Vertex 2 is built using 99% interpolation of the previous spline segment, and uses the inverse arbitrary bone segment width. Vertex 3 is a unique vertex built for this joint object. Vertex 3 is simply the position of the spline segment at 99% interpolation. Vertex 4 is built using 1% interpolation of the current spline segment. Vertex 5 is built using 1% interpolation of the current spline segment and uses the inverse arbitrary bone segment width.

The arrangement of the polygons within the joint object allows for ideal deformations as a character animates and limbs foreshorten and rotate within the cameras' view.

In stage 4-4, the polygons of the bone chain, for both joint(s) and bone segments, are warped according to the relative position of each segment and of each joint.

In stage 4-5, the sprite for this element is warped according to the warping of the polygons, thereby providing the visual impression of 3D rendering.

Optionally and preferably, during the actual rendering process, raster based rendering is used. For example, when the polygons are triangles, raster based rendering would correspond to rendering with texture based triangles. If vector based rendering is used, then the rendering would be performed on a per vertex basis, rather than being dependent upon triangles.

Optionally, the methods of FIGS. 3 and 4 can be by-passed for rendering platforms that lack the ability to render textured polygons, such as textured triangles. For this non-limiting embodiment, the sprites of which limbs are composed are assembled without warping, such that each limb becomes an assemblage of rigid pieces. Each piece corresponds to a sprite. Alpha masks may optionally be applied to achieve the desired degree of transparency for overlap (see below for a discussion of alpha values in drawing order). Such a process may optionally be performed automatically, without requiring any additional manual work (apart from any work required to generate the sprite sheet initially).

Figure 5:
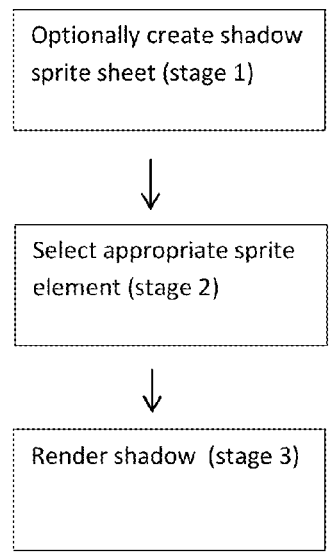
FIG. 5 shows a non-limiting, exemplary method for determining appropriate shadow(s) for each character.

The non-limiting, exemplary method of FIG. 5 relates to a computationally inexpensive method for determining appropriate shadow(s) for each character. Shadows are optionally and preferably also rendered with sprites as described herein.

In stage 501, a plurality of sprites are created offline to form a sprite sheet for each element of each character, for representing the shadows that would be cast by that character. Shadows are generally rendered through computer animation by compressing a three dimensional object to a plane and then placing the plane on the floor. In this case, the elements of the character are each so manipulated so as to generate a plurality of shadow sprites. Optionally stage 501 is not performed as the same sprite sheet may be used for each element by using only the alpha channel (effectively a one color mask).

In stage 502, an appropriate shadow sprite is selected for each element of the character. In stage 503, optionally the shadow sprite is rotated to correctly correspond to the orientation of the corresponding character elements and the shadow projection matrix is used to render the shadow.

Figure 6:
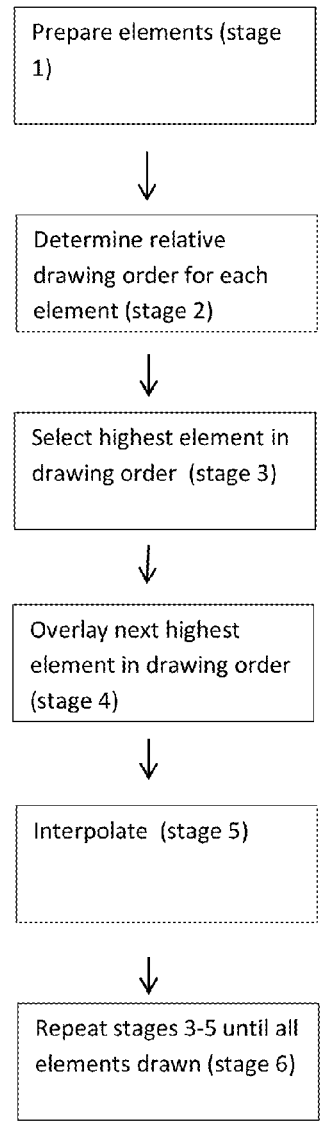
FIG. 6 shows an optional, exemplary order for determining the drawing order of all elements of the character.

FIG. 6 shows an optional, exemplary order for determining the drawing order of all elements of the character. Since each character is actually first determined as a plurality of elements, these elements need to be appropriately combined to form the final composite, which is the final completely drawn character.

Turning now to FIG. 6, in stage 601, the complete set of elements is optionally prepared. If the drawing order can be known a priori, optionally it is not necessary to wait for all of the elements to be prepared. However, the below method is preferably operated sequentially for each element in a particular plane, starting with the plane which has the greatest depth (i.e. –distance from the position of the observer) and then continuing with each plane having less depth than the previous plane but greater depth than all other planes. As described herein, the method relates to a camera position for determining the sorting order.

Each pixel is represented by RGB (red, green, blue) values and their corresponding alpha (opacity) values, plus the z, or depth, value for that pixel. However, some rendering engines such as Flash do not have a depth buffer, such that the order must be determined as described below.

In stage 602, the relative drawing order for each element is determined, which in turn determines the relative depth at which each element should be rendered. Optionally and preferably the below process is followed.

First, an element, such as a joint, is selected as the 'root' element. This element optionally and preferably corresponds with the positioning of the torso within a standard anthropomorphic character; for other types of characters, optionally a different root element may be selected according to the positioning of the largest element of which the character is composed. The directional vector from the camera and this root element is calculated.

Next, the elements to be sorted are separated into two groups—elements behind the root element from the specified camera's point of view, and elements in front of the root element from the specified camera's point of view. For each element to be sorted, a directional vector is calculated from the root element and the element being sorted. The dot product of this directional vector and the vector calculated via the camera and the root element is taken. Dot products with a positive result, and hence their corresponding elements, are sorted into one group, while negative results (and their corresponding elements) are sorted into a secondary group.

Next, manual swapping of elements between groups is performed to support any arbitrary 'rules' for sorting the elements. For example, a predefined rule may optionally state that all leg-associated sprites must be drawn after the root element. If such elements are not already present in the appropriate group, they are moved to that group.

The two groups are then sorted via a 'quicksort' algorithm, according to their distance from the predefined camera. The two separate groups are joined into a single group and the order is reversed, resulting in a proper draw order.

Optionally, the relative drawing order may be affected through application of a z-mask, which can be used to increase the speed of rendering. A z-mask means that element(s) belonging to a particular position in the drawing order are only rendered to the extent that they appear in front of one or more other element(s) which are lower down in the drawing order. For example, for hair surrounding a head, the head is only rendered where there is no hair.

Other masks may optionally be used to apply visual effects to a particular element, for example to show a discontinuity within a particular element. The discontinuity could be a hole in an element of clothing, or an altered border shape (a V-neck sweater as opposed to a round-neck sweater, for example). This discontinuity is preferably applied as a mask rather than as a separate element, to reduce computational complexity and to increase the speed of rendering.

In stage 603, each element that has not been drawn but that is highest in the drawing order is selected. For example, if no elements have been drawn, then any element that is indicated to be first to be drawn would be highest in the drawing order at that point. In stage 604, one or more elements which are farther down in the drawing order than the element(s) of stage 603, but which have the same position in the drawing order, are selected, and are overlaid on the element(s) of stage 603 by blending the color and alpha values as is known in the art, on a pixel by pixel basis.

In stage 605, interpolation is used to overcome any issues related to pixels on which different layers (planes) of elements cross.

In stage 606, the process of stages 603-605 is repeated, until all elements have been drawn.

Optionally various two dimensional effects may be incorporated at any stage of the compositing process, for example upon rendering each element, after all elements have been drawn, or at any intermediate stage in the above compositing process. Such effects include but are not limited to any alteration of the outline of any element, group of elements and/or the entire character, to produce such effects as blurring of the outline, imparting a "glowing" effect and so forth.

As previously noted, shadow sprites are preferably selected for each element and are rotated as necessary to match the actual sprite for that element of the character. Optionally, sprite sheets can generally be reduced in terms of the number of sprites required if sprites can be reused for multiple positions and poses through rotation. Furthermore, elements that are radially symmetric need only be represented once for a set of angles (and not only rotations).

Figure 7:
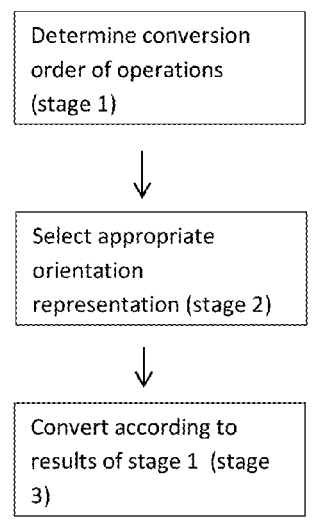
FIG. 7 shows an optional, exemplary method for consistent quaternion-to-Euler angle conversions, which may optionally be used to support consistent sprite rotation (and also for other aspects of orientation manipulation of the elements)

FIG. 7 shows an optional, exemplary method for consistent quaternion-to-Euler angle conversions, which may optionally be used to support consistent sprite rotation (and also for other aspects of orientation manipulation of the elements).

In stage 701, a predetermined order of operations is provided for converting quaternions to the corresponding set of Euler angles. As is known in the art, for each orientation of any object, there is only one possible quaternion but multiple possible sets of Euler angles. To maintain consistency during rendering, the predetermined order of operations is used for each subsequent conversion.

In stage 702, orientation is represented by a quaternion or Euler angle set as appropriate, followed by the performance of any necessary mathematical processes (such as interpolation for example). In stage 703, if conversion is required between a quaternion representation and one using Euler angles, then the predetermined order of operations as determined in stage 701 is used for performing the conversion so as to obtain consistent results.

Figure 8:
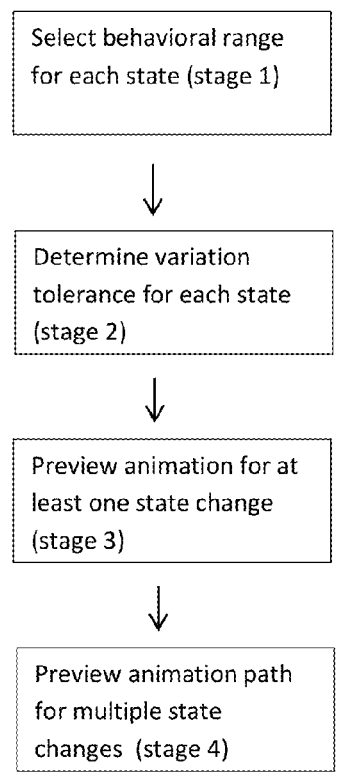
FIG. 8 shows an exemplary, illustrative method according to at least some embodiments of the present invention for determining an optimal path through 2D spritesheet-space.

Transitioning between the positions of various elements is preferably selected so as to avoid "popping" and other artifacts. According to the exemplary, illustrative method shown in FIG. 8, an optimal path through 2D spritesheet-space is selected to minimize the frequency of transitions between states.

In stage 801, the behavioral range for each state of each element is preferably selected. For example, for a head element, it is possible to determine that each state of the head relates to 30 degrees of rotation.

In stage 802, the tolerated variation beyond the behavioral range for that element is selected. For example, optionally the head element could be allowed to continue to rotate to 45 degrees before the next sprite is to be selected.

In stage 803, preferably the animation is previewed before rendering is required, in order to determine whether a state change in a particular element is required. Optionally for example, various heuristics could be applied to a particular element of a particular character to avoid "jitter" and other artifacts. As another example, a "clamp" could optionally be applied to a particular element according to the current behavior of the character, to avoid a stage change, so that for example the hands could have an x, y clamp applied when the character is walking so that the hands can only move along the z-axis.

In stage 804, such previewing may optionally be performed for the overall path of the animation (i.e. for multiple potential stage changes) in order to determine the minimum number of required transitions. For example, if the path of animation could cause the state of the head element to change multiple times, preferably the number of changes is minimized by considering the overall effect of the path on the state of the head element. The determination of a desired path may optionally be at least partially controlled by the selection of state changes which cause minimal transitions in x and y. Also optionally one or more heuristics are applied, in order to further obtain some desired effect: reduced state changes, more "natural" movement, and so forth.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A method for producing realistic computer animation for a character, comprising decomposing the three dimensional character into a plurality of two dimensional elements, wherein said decomposing the three dimensional character into said plurality of two dimensional elements comprises decomposing the three dimensional character into at least one rigid element and at least one flexible element, and a plurality of limbs; decomposing each limb to at least one joint and a plurality of segments, each joint having a plurality of vertices; determining a position of each vertex; determining a plurality of polygons for said limb; warping said polygons of each joint according to said position of each vertex; preparing low resolution approximations of at least some two dimensional elements for constructing a three dimensional approximation of the three dimensional character; performing a first applying one or more sprites to the low resolution approximations of the two dimensional elements, except for said at least one rigid element; performing a second applying of one or more sprites to said at least one rigid element, wherein said second applying of said one or more sprites for said at least one rigid element is performed without said preparing said low resolution approximation for said at least one rigid element; transforming said one or more sprites according to said low resolution approximations to render the three dimensional character, or for said at least one rigid element, directly rendering said at least one rigid element from said one or more sprites; and displaying the rendered three dimensional character.

2. The method of claim 1, wherein said decomposing the three dimensional character into said plurality of two dimensional elements comprising decomposing the three dimensional character into a plurality of limbs, a torso and a head.

3. The method of claim 2, the method further comprising constructing a three dimensional approximation of at least a portion of the three dimensional character in a first pose or position before said first or said second applying of said one or more sprites.

4. The method of claim 3, wherein said constructing said three dimensional approximation of said at least a portion of the three dimensional character in said first pose is performed for said torso and further comprises skinning said torso.

5. The method of claim 4, wherein said skinning comprises one or more of standard weighted character skinning, cloth simulation or soft-body dynamics simulation, or a combination thereof.

6. The method of claim 3, wherein said first applying said one or more sprites to said low resolution approximations comprises determining an angle of said torso according to said pose and selecting a torso sprite according to said angle of said torso.

7. The method of claim 6, wherein said first applying said sprite comprises applying said torso sprite to said torso as texture.

8. The method of claim 7, wherein said first and said second applying and said transforming said one or more sprites is performed more than once, wherein said rendering said torso comprises rendering said torso with a plurality of polygons and wherein said first and said second applying said one or more sprites further comprises removing any non-relevant polygons before said first and said second applying said one or more sprites.

9. The method of claim 1, further comprising approximating said limb by a spline.

10. The method of claim 9, wherein said approximating said limb by said spline further comprises determining an encapsulating polygon for each segment and a plurality of polygons for each joint; interpolating vertices of said polygons of said joint according to previous and current segments of said spline; and warping said polygons of said joint according to said interpolating.

11. The method of claim 1, further comprising preparing a sprite sheet comprising a plurality of torso sprites before the three dimensional character is rendered.

12. The method of claim 11, wherein said decomposing the three dimensional character into a plurality of two dimensional elements and said preparing said low resolution approximations of said at least some two dimensional elements is performed before the three dimensional character is rendered.

13. The method of claim 12, further comprising a third applying a plurality of shadow elements to the three dimensional character, each shadow element corresponding to a sprite.

14. The method of claim 13, wherein said displaying the three dimensional character further comprises determining a drawing order for said shadow elements.

15. The method of claim 14, wherein said determining said drawing order comprises determining a root element; sorting said shadow elements according to their appearance in front of or behind said root element; changing said sorting according to one or more predefined rules; and drawing said shadow elements according to said sorting.

16. The method of claim 15, wherein said third applying and said transforming are applied to change a state of the three dimensional character, the method further comprises determining a minimal path for changing said state of the three dimensional character during animation of the three dimensional character.

17. A system for providing a computer game, the game comprising at least one animated three dimensional character, the system comprising a user computer for being operated by a user and for receiving one or more commands from the user; a server computer for performing the method of claim 1 according to said one or more commands from the user computer; and a communication network for supporting communication between the user computer and the server computer.

* * * * *